(12) United States Patent
Tennebo et al.

(10) Patent No.: US 7,239,265 B2
(45) Date of Patent: Jul. 3, 2007

(54) METHOD FOR EVALUATING AND CONTROLLING A RADAR INSTALLATION

(75) Inventors: Frode Tennebo, Halden (NO); Tore-Bjornar Stenbock, Göteborg (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 154 days.

(21) Appl. No.: 10/543,851

(22) PCT Filed: Feb. 3, 2003

(86) PCT No.: PCT/NO03/00032

§ 371 (c)(1),
(2), (4) Date: Jul. 28, 2005

(87) PCT Pub. No.: WO2004/070415

PCT Pub. Date: Aug. 19, 2004

(65) Prior Publication Data

US 2006/0139202 A1    Jun. 29, 2006

(51) Int. Cl.
*G01S 13/08* (2006.01)
(52) U.S. Cl. ............... 342/73; 342/65; 342/74; 342/75; 342/120; 342/123; 342/195
(58) Field of Classification Search ........... 342/65, 342/73–81, 90, 95–97, 107, 108, 113, 120–123, 342/133, 135, 136, 139, 140, 145–147, 195
See application file for complete search history.

(56) References Cited

U.S. PATENT DOCUMENTS

| | | | | |
|---|---|---|---|---|
| 2,570,251 A | * | 10/1951 | Lester | 342/142 |
| 3,295,128 A | * | 12/1966 | Canaday et al. | 342/129 |
| 3,311,913 A | * | 3/1967 | Varela | 342/123 |
| 3,364,484 A | * | 1/1968 | Best | 342/140 |
| 3,448,450 A | * | 6/1969 | Alfandari et al. | 342/157 |
| 3,971,020 A | * | 7/1976 | Howard | 342/129 |
| 4,449,127 A | * | 5/1984 | Sanchez | 342/80 |
| 4,499,468 A | * | 2/1985 | Montana et al. | 342/126 |
| 6,078,289 A | * | 6/2000 | Manoogian et al. | 342/373 |
| 2006/0139202 A1 | * | 6/2006 | Tennebo et al. | 342/13 |

FOREIGN PATENT DOCUMENTS

EP    323688 A1 *  7/1989

OTHER PUBLICATIONS

"Optimum tilt for elevation-scanned phased arrays", Solbach, K., Antennas and Propagation Magazine, IEEE, vol. 32, Issue 2, Apr. 1990 pp. 39-41.*
Didomizio J et al.: "Firefinder: Position Analysis System Advanced Development Model" IEEE Aerospace and Electronics Systems Magazine Sep. 1996, IEEE, USA, vol. 11, No. 9, pp. 25-29, XP002247140 ISSN: 0885-8985 p. 25, right column, line 24—p. 27, left column, line 4, figure 2.

(Continued)

*Primary Examiner*—John B. Sotomayor

(57) ABSTRACT

A method is disclosed for evaluating the terrain surrounding a radar site. The method comprises to calculate the radar horizon around a radar site from stored terrain elevation information. The information obtained can be used for controlling the scanning profile of the radar, by letting the radar scan above the calculated horizon, and thus avoiding transmitting into the terrain.

4 Claims, 5 Drawing Sheets

OTHER PUBLICATIONS

O'Hern B et al: "The Radar Support System (RSS): A tool for sitting radars and predicting their performance" Proceedings of the 1997 IEEE National Radar Conference (Cat. No. 97CH36017), Proceedings of the 1997 IEEE National Radar Conference, Syracuse, NY, USA, May 13-15, 1997, pp. 211-216, XP002247141 1997, New York, NY, USA, IEEEE, USA ISBN: 0-7803-3731-X p. 211;figure 3.

Gabella M et al: "Clutter and shadowed areas characterization of meteorological radars" Tenth International Conference on Antennas and Propagation (Conf. Publ. No. 436), Edinburgh, UK, Apr. 14-17, 1997, pp. 255-260 vol. 2, XP002247142 1997, London, UK, IEEE, UK ISBN: 0-85296-686-5 p. 255, left column, line 1—right column, line 20; p. 256, right column, lines 21-34.

O'Hern, B., et al., "The Radar Support System (RSS); A Tool for Siting Radars and Predicting Their Performance" Proceedings of the 1997 IEEE National Radar Conference (Cat. No. 97CH36017), Proceedings of the 1997 IEEE National Radar Conference, Syracuse, NY, USA, May 13-15, 1997, p. 19-26, XP00224714 , ISBN0-7803-3731-X.

Didomizio J, et al., "Firefinder: Position Analysis System Advanced Development Model" IEEE Aerospace and Electronics Systems Magazine, Sep. 1996, IEEE, USA, vol. 11, No. 9, pp. 25-29, XP002247140, ISSN: 0885-8985.

* cited by examiner

METHOD FOR EVALUATING AND CONTROLLING A RADAR INSTALLATION

FIELD OF THE INVENTION

The present invention relates to the field of radar technology, and in particular a method for the calculation and presentation of a terrain profile for the purpose of evaluating a geographical site, and control the scanning pattern of a radar from the terrain profile.

TECHNICAL BACKGROUND

When positioning a land-based radar which purpose is to scan the horizon around a geographical site, it is often practical to know at which elevation to start scanning. This way one can avoid spending time scanning directly into e.g. mountains.

One possible solution is for the radar to initiate a search in elevation (e.g. from the highest allowed elevation and down) for the horizon, typically on a sector-by-sector basis, and detect where the ground clutter level starts to be significant.

A radar can get a certain amount of false echo above the horizon (e.g. birds, second-time-around echo from distant planes, etc) which may set the horizon higher than necessary. Sometimes radar echo are also sufficiently absorbed by surrounding terrain so that the horizon may be set lower than required.

Rain, snow and fog can also affect such a measurement.

In addition a radar often has a minimum range of detection. This result in objects which constitute part of the horizon and being "too close" blocks the view without the radar detecting this.

Another important issue in military applications is Electronic Warfare where radar silence is an important counter measure. This means that search elevation have to be found without using the radar actively.

BRIEF SUMMARY OF THE INVENTION

Thus, it is an object of the present invention to provide a method for evaluating the terrain around a radar site that is quickly performed without relying on the radio properties of the radar installation.

Another object is to provide a method that can be performed without betraying the presence of the radar.

These objects are met by a method as defined in the appended patent claims. In essence, the method comprises to calculate the radar horizon around a radar site from stored terrain elevation information.

BRIEF DESCRIPTION OF THE DRAWINGS

The invention will now be described in detail in reference to the appended drawings, in which.

DETAILED DESCRIPTION OF THE INVENTION

The invention consists of a method for evaluating a radar horizon around a radar site. The radar can then import this information and use it for setting up a scanning pattern that avoids the transmission of energy into the surrounding terrain.

The method is performed on a computer that, from a given position, divides the surrounding terrain into sectors. In each sector a number of calculation points are chosen, based on simple geometrical considerations.

Figure 2:
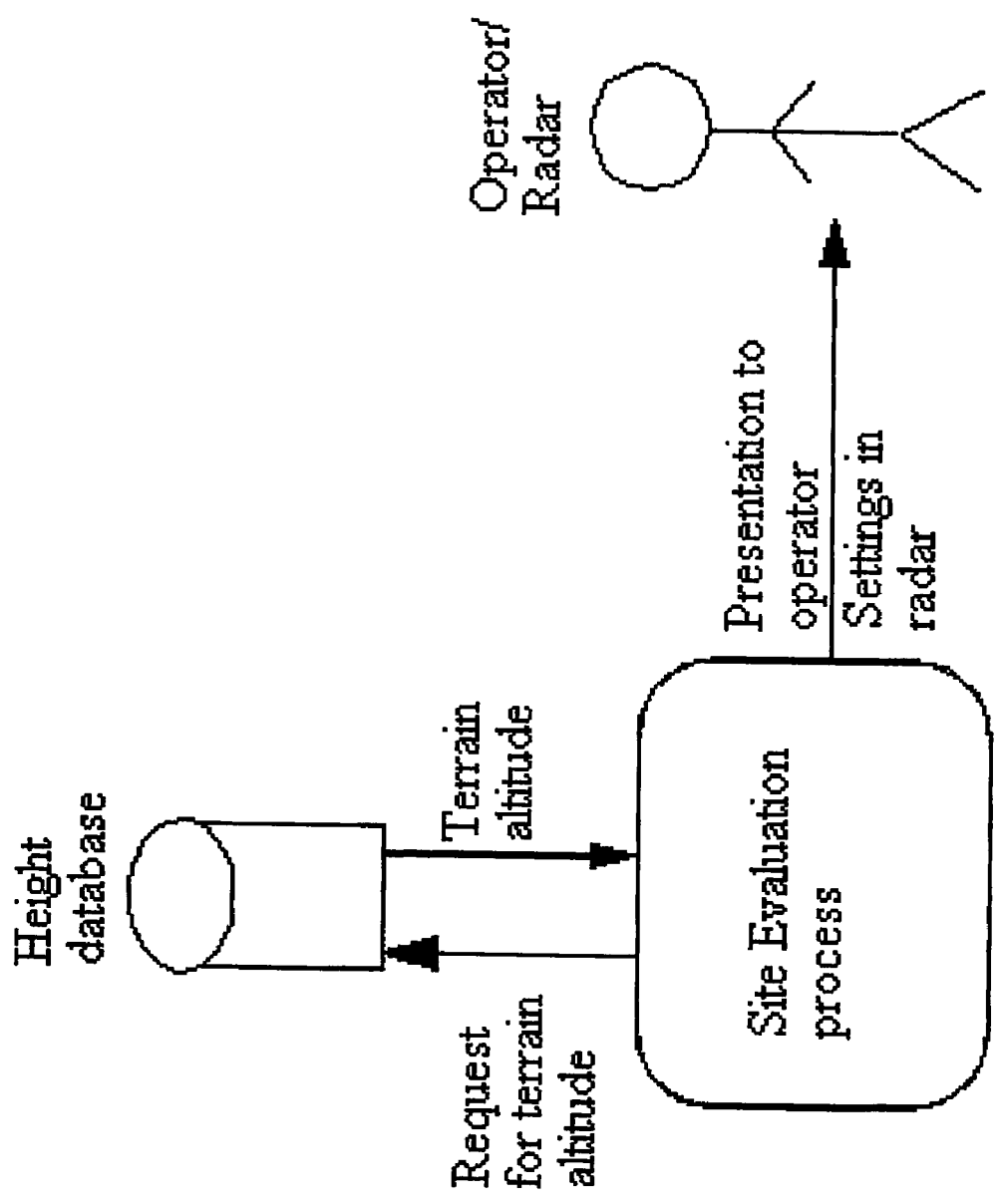
FIG. 2 is a schematic view of a radar installation with the necessary equipment for performing the inventive method.

In each calculation point the radar search elevation angle is calculated from terrain altitude information stored in a database. FIG. 2 shows the process. The computer consults the database for each calculation point. If the angle is greater than the previous angle in the current sector, then this angle is stored as the greatest angle. The reason for this is that a nearby object, e.g. the small hill, might "shadow" a larger object farther away, e.g. a mountain in the distance. The stored angle is lowest angle the sweeping ray may use in order to clear the terrain in this sector.

The suite of stored angles for all sectors considered constitutes a "radar horizon" for this particular site. The calculated horizon can then be presented for the radar operator and the radar scanning pattern can be adjusted accordingly, either automatically (i.e. directly), manually (i.e. operator confirmed) or semi-automatically (i.e. directly but where the operator can adjust manually at a later time).

The calculation is performed either as a separate program or as part of an already existing program on the computer where access to a suitable set of terrain altitude data on a digital format is required. This terrain data, e.g. DTED, can be stored in a conventional or proprietary database, preprosessed or otherwise, or in raw DTED format outside of, but connected to, the invention (DTED: Digital Terrain Elevation Data, METRIC MIL-PRF-89020A).

The latter is particularly ideal as it provides for the user of the invention to add further terrain data with the detailing level for the area of interest without requiring a separate tool.

Figure 1:
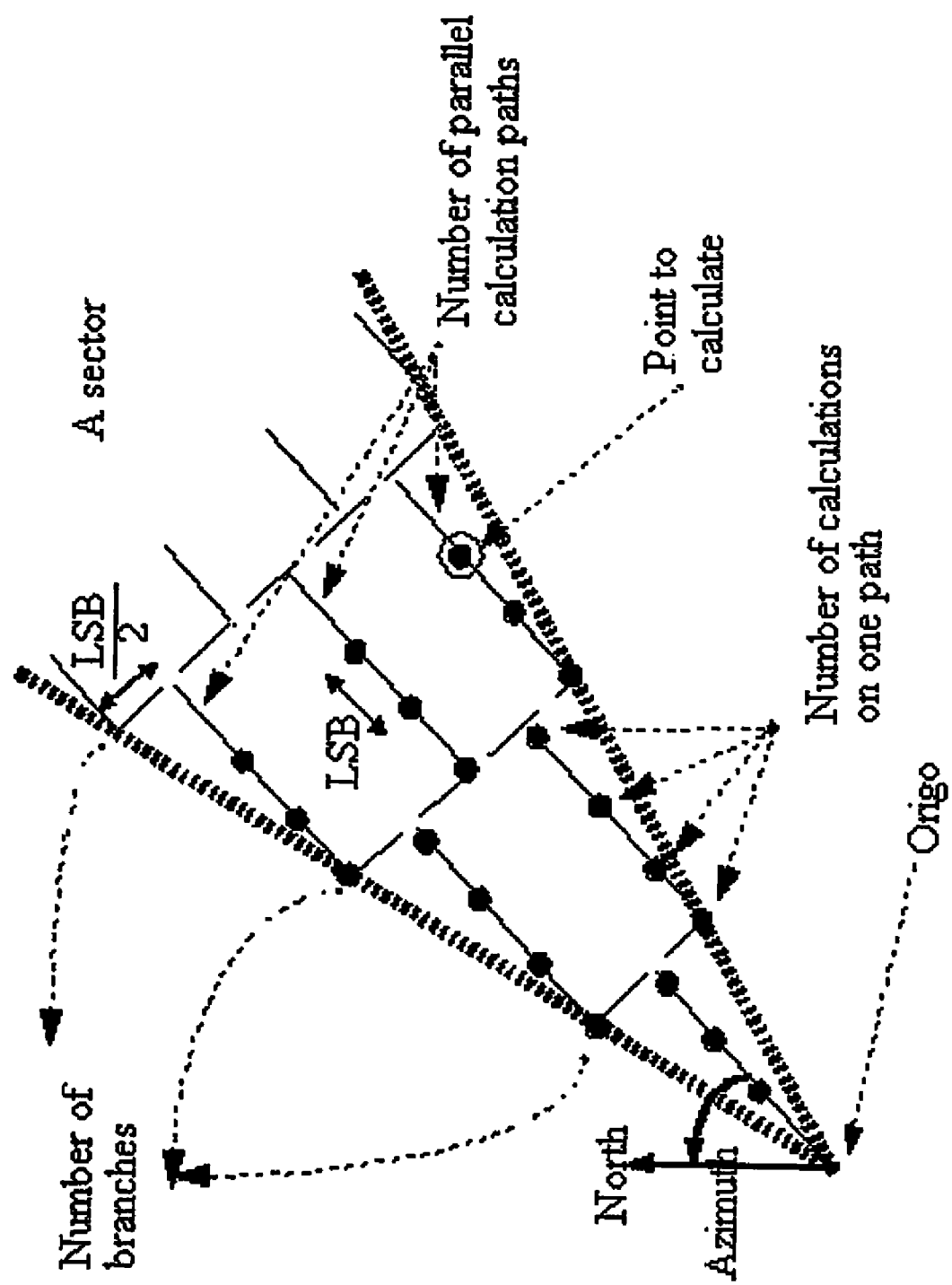
FIG. 1 is a diagram showing a sector of the terrain around a radar site and the positions of the points in which the elevation of the terrain is calculated.

FIG. 1 shows how the calculation points are chosen within a sector. Near to the radar site, the altitude is fetched from the database in points along a line going outward from the site. Whenever the distance between an edge of the sector and the nearest point grows too great the number of calculation branches is increased by one. When branching occurs, the calculated values in parallel points (i.e. in points at the same range in parallel branches) are compared, and the highest value chosen as the value representing this particular range.

In particular the following parameters are considered:
Absolute geographical position of origo
Sector width
Number of sectors (ie. the total view)
Azimuth offset
Max sector range; the length of each sector from the observation point
Stepsize; the distance between each sampled point from the altitude database (LSB in FIG. 1). The stepsize is chosen dependent on the resolution in the altitude database and the general calculation performance desired.

From these initial parameters the following is calculated:
Number of calculations (steps) in one path; this value is calculated from the stepsize and sector width parameters in the input data. Each look up in the altitude database is done for every step length along a path (or a line) inside the sector until the stepsize limit is reached. The stepsize limit is reached when the width of the sector is greater than the horizontal cell size in the altitude database.

Number of branches; this value is calculated from the stepsize, max sector range and stepsize parameters in the input data. When the stepsize limit is reached for all existing parallel paths (if any) then the algorithm performs a branch which means that the number of parallels is increased by one.

Number of parallel calculation paths; this value is calculated from the stepsize parameter in the input data. When the look-ups in the altitude database for the parallel paths do not cover the width of the subsector, it is increased by one. The parallel paths have the same azimuth and number of calculations on the path, but displacement sideways is different.

Displacement; a function of the previous parameter.

Figure 3:
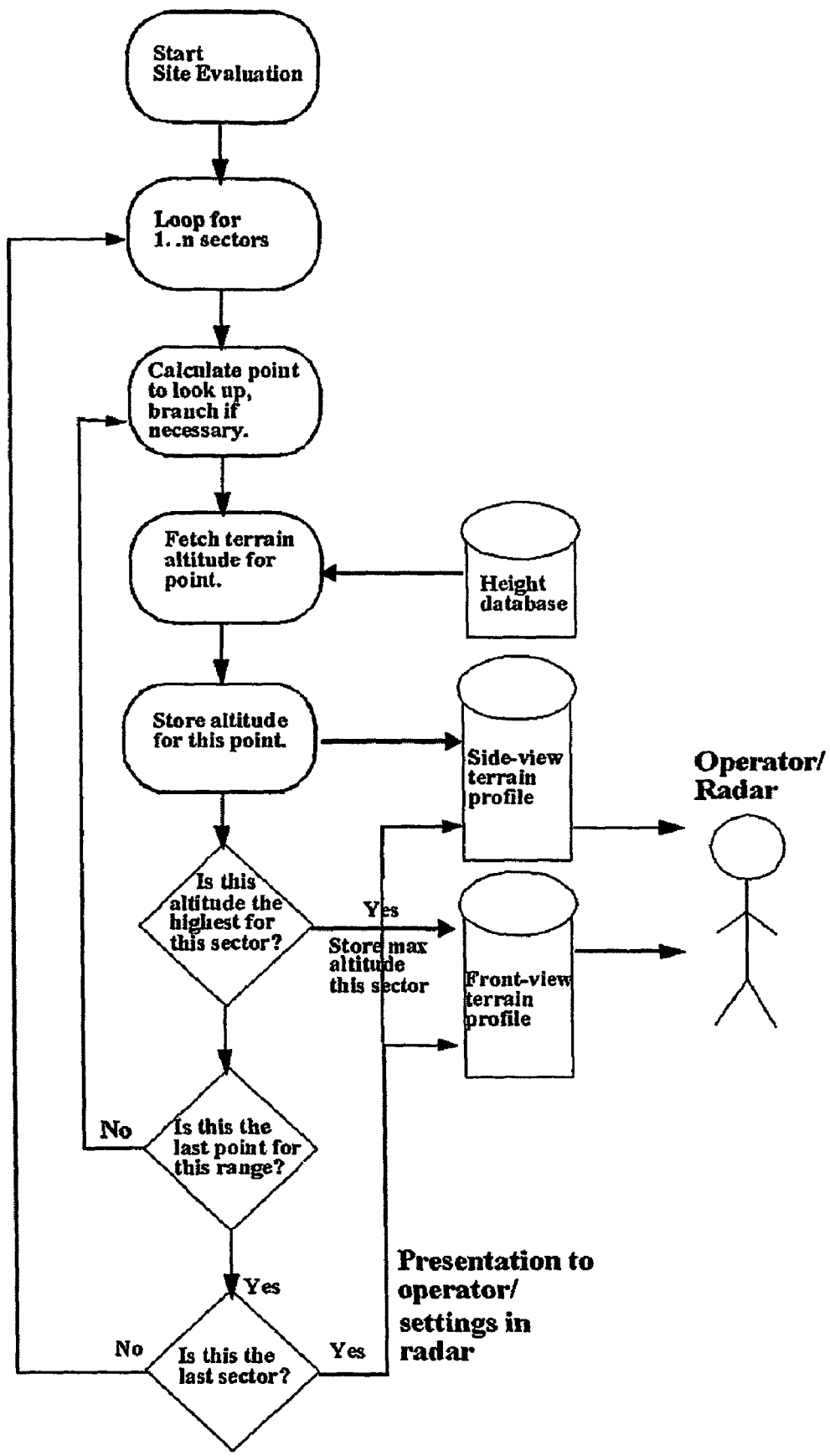
FIG. 3 is a flow diagram showing the individual steps performed in the inventive method.

FIG. 3 shows visualizes the individual steps performed in the procedure for evaluating a site.

A geographical point is calculated by looping through, in nested order, the number of branches, number of paralells and number of steps. For each point the following procedure is performed:

Based on the azimut, the range and the displacement a transformation from polar to Cartesian coordinates is performed. This gives a geographical coordinate relative to origo. For this point the terrain altitude is retrieved from the height database (see FIG. 2). This altitude is stored in the side-view terrain profile, if it is the highest altitude for this range. The elevation is then calculated as:

$$\arctan (\text{altitude}/\text{range})$$

and is then compared to the previous highest elevation for the sector. If it is the highest it is stored in a front-view terrain profile, FIG. 4.

This procedure is the repeated for all points and for all branches for the specified sector. The end result can visually be presented like in FIG. 5.

Figure 4:
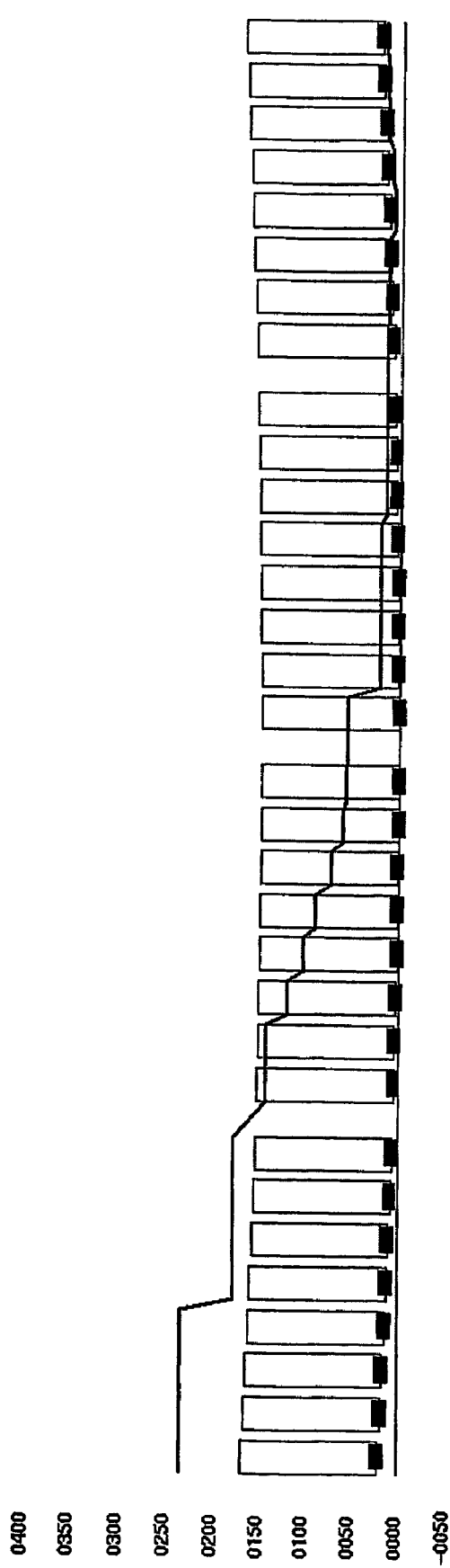
FIG. 4 is the resultant radar horizon in front views.
Figure 5:
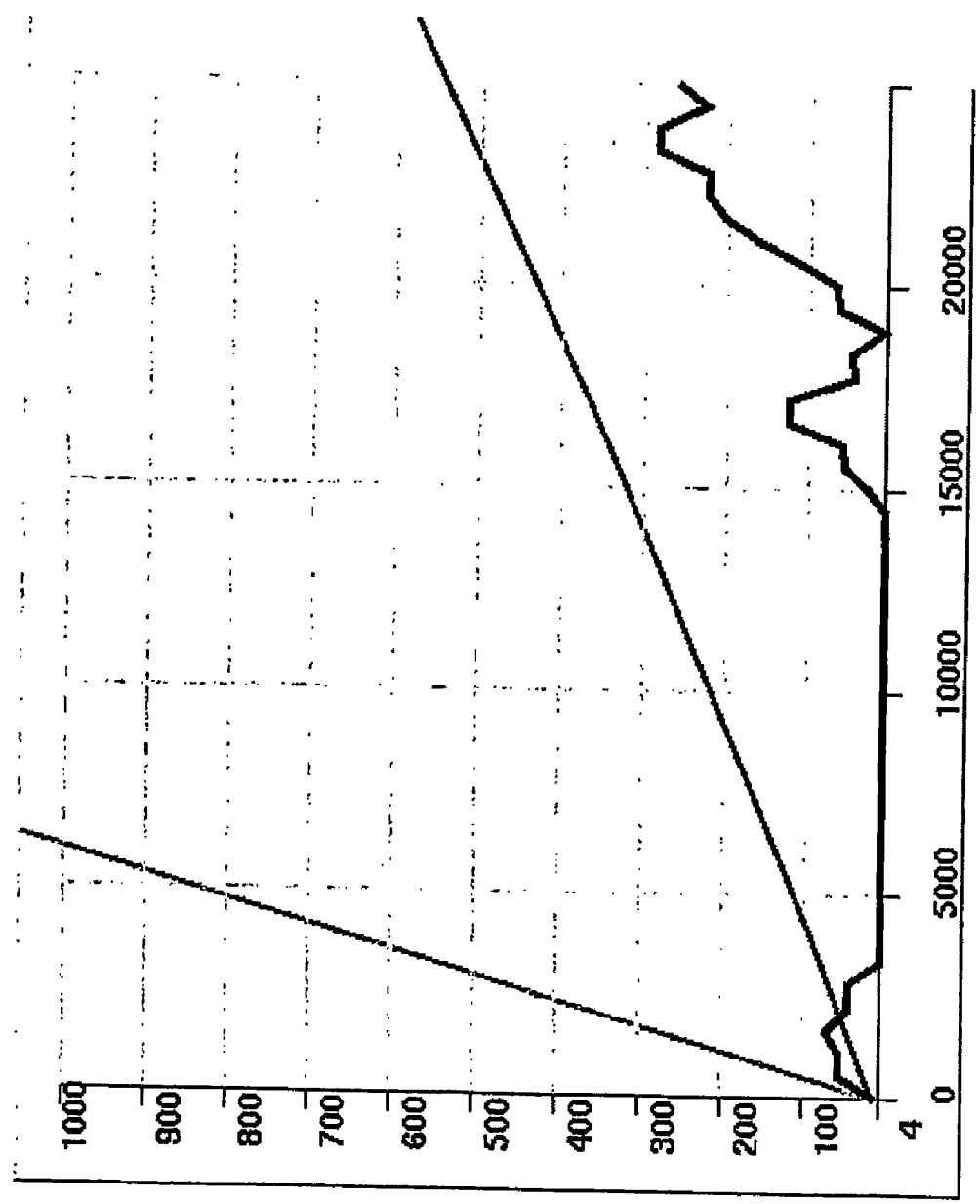
FIG. 5 is a section along one of the sectors in FIG. 4, illustrating how the resultant profile is obtained.

The view in FIG. 5 is of the left-most sector in FIG. 4. The visibility here is limited by a nearby obstruction.

The invention can be used for evaluating possible radar sites, e.g. when placing a radar installation for an airport. It allows for off-site evaluation of the terrain. Thereby multiple sites can be evaluated and the best located.

The method can also be performed "on the fly" when relocating a mobile radar. In this application the vertical profile shown in FIG. 4 is of particular usefulness, as it can indicate for the operator that a better place can be found in the immediate neighborhood.

Another possible application is to use the method for automatically guiding a mobile unit, e.g. a vessel, car or airplane, to the "best" sites along its course.

However, the main application will be in establishing a scanning horizon for a radar when it has been installed at its site. In this respect one obtains the advantage of eliminating the problems of determining why an echo has not returned and whether it has returned for the "wrong" reasons.

The invention claimed is:

1. A method for establishing a scanning horizon for a radar installation at a first position, comprising the steps of:
  a) dividing the terrain surrounding said first position into a number of sectors,
  b) finding altitudes of successive points along a sector by consulting terrain information stored in a database, including near to the radar site, finding the altitudes in points along a line going outward from the site, and whenever the distance between an edge of the sector and the nearest point grows above a predefined distance, increasing the number of calculation branches by one, comparing the found values in parallel points, and choosing the highest value as the value representing this particular range,
  c) calulating an elevation value in each of the successive points along said sector from the relationship elevation=arctan (altitude/range), d) comparing the elevations of all the successive points in the sector to find a point of highest elevation
  e) storing said point of highest elevation for said sector in a front view terrain profile
  f) repeating steps b) to e) for another sector.

2. The method as claimed in claim 1, further comprising the step of storing the altitudes found in step b) in a side view profile.

3. An arrangement for controlling a radar, comprising:
  a database containing terrain elevation information,
  means for fetching from the database the altitudes of successive points along a sector of the terrain around the radar installation,
  means for calculating the elevations of the successive points in the sector and comparing the elevations in order to find the point of highest elevation,
  means for storing said point of highest elevation in a front view terrain profile,
  said means being adapted to calculate corresponding information for all sectors surrounding the radar installation, and
  a control unit adapted to control said radar to scan the horizon defined by the elevations in said front view terrain table.

4. The arrangement as claimed in claim 3, further comprising means for storing said altitudes in a side view terrain profile.

* * * * *

UNITED STATES PATENT AND TRADEMARK OFFICE
CERTIFICATE OF CORRECTION

| | | |
|---|---|---|
| PATENT NO. | : 7,239,265 B2 | Page 1 of 1 |
| APPLICATION NO. | : 10/543851 | |
| DATED | : July 3, 2007 | |
| INVENTOR(S) | : Tennebo et al. | |

It is certified that error appears in the above-identified patent and that said Letters Patent is hereby corrected as shown below:

On The Title page, Item (75), under "Inventors", Line 3, delete "(NO)" and insert -- (SE) --, therefor.

In Column 3, Line 18, after "shows" delete "visualizes".

In Column 3, Line 24, delete "azimut" and insert -- azimuth --, therefor.

In Column 4, Line 21, in Claim 1, delete "calulating" and insert -- calculating --, therefor.

Signed and Sealed this

Twenty-seventh Day of May, 2008

JON W. DUDAS
*Director of the United States Patent and Trademark Office*